United States Patent
Hale (10) Patent No.: US 8,457,894 B2
(45) Date of Patent: Jun. 4, 2013

(54) NAVIGATION DEVICE AUTOMATED MODE SENSING AND ADJUSTMENT

(75) Inventor: Jeffrey Charles Hale, Littleton, CO (US)

(73) Assignee: Echostar Technologies L.L.C., Englewood, CO (US)

( * ) Notice: Subject to any disclaimer, the term of this patent is extended or adjusted under 35 U.S.C. 154(b) by 704 days.

(21) Appl. No.: 12/560,141

(22) Filed: Sep. 15, 2009

(65) Prior Publication Data

US 2011/0066364 A1    Mar. 17, 2011

(51) Int. Cl.
    *G01C 21/36*    (2006.01)
(52) U.S. Cl.
    USPC ........................................................ 701/533
(58) Field of Classification Search
    USPC .............. 701/23–25, 400, 408, 430–433, 533
    See application file for complete search history.

(56) References Cited

U.S. PATENT DOCUMENTS

2008/0312825 A1 * 12/2008  Abe ............................... 701/208
2010/0211304 A1 *  8/2010  Hwang et al. .................. 701/200

* cited by examiner

*Primary Examiner* — Yonel Beaulieu
(74) *Attorney, Agent, or Firm* — Kilpatrick Townsend & Stockton LLP (57) ABSTRACT

A navigation device automatically determines a travel mode based on at least one non-user input and configures itself based on the travel mode. The device generates one or more directions or navigation routes based on routing information, a user location, a destination, and the travel mode. The device then displays the one or more directions for the user. The automatic determination may be based on a travel speed, connection to an external power source, connection to an external power source and a travel speed, and/or receipt of one or more signals from a transmitter coupled to a vehicle. The user may be able to override configuration of the device based on the travel mode. The system may be implemented as an integrated device or may be implemented as a server computing device connected to a client computing device.

20 Claims, 6 Drawing Sheets

NAVIGATION DEVICE AUTOMATED MODE SENSING AND ADJUSTMENT

FIELD OF THE INVENTION

This invention relates generally to navigational devices, and more specifically to navigational device mode sensing and adjustment.

BACKGROUND

Navigation devices, such as GPS (global positioning system) devices that provide turn by turn direction or devices that have a primary non-navigation function but include non-primary navigation function (such as a cellular telephone that includes a navigation application), provide users with detailed directions to an intended destination. Generally, these navigation devices receive an intended destination from a user and the present location of the user is detected. Directions or navigation routes are then generated to direct the user from the present location to the intended destination based on stored (or downloaded) routing information about the geographic region between these two points. This routing information typically includes information about streets, driving directions, geographic characteristics and so on. The generated directions are then present to the user.

The navigation devices typically generate directions according to an operational mode which corresponds to a travel mode. For example, in a pedestrian mode directions may be generated to direct the user to walk from the present location to the intended destination. By way of another example, in a driving mode directions may be generated to direct the user to drive from the present location to the intended destination.

The user may experience problems if the navigation device generates directions according to an operational mode that does not correspond to the travel mode the user is utilizing. As a result of these problems, the user may travel in a way that is unsafe or inefficient. For example, if the navigation device is set to generate directions according to a pedestrian mode and the user is driving, the directions may direct the user to drive the wrong way on a one way street or a traffic circle. By way of another example, if the navigation device is set to generate directions according to a driving mode and the user is walking, the directions may direct the user to walk on a bridge where pedestrian traffic is prohibited. The user would not experience these problems if the navigation device did not generate the directions according to an operational mode that does not correspond to the travel mode the user is utilizing.

SUMMARY

The present disclosure provides systems, methods, techniques, instruction sequences, and/or computer program products that perform automatic mode sensing and adjustment for navigation devices.

In some implementations, a navigation device operates in an initial operational mode corresponding to a travel mode. The navigation device receives an intended destination from a user. The navigation device also detects a location of the user. The navigation device then generates one or more directions or navigation routes based on routing information, the location of the user, the intended destination, and an automatically determined travel mode. The navigation device then displays the one or more directions to the user.

The travel mode may be walking and the operational mode may be a pedestrian mode. The travel mode may be vehicular travel and the operational mode may be a driving mode.

In some implementations, the navigation device may determine that the user is traveling utilizing a particular travel mode based on a travel speed calculated based on one or more signals received by one or more sensors and the navigation device may configure itself to generate the one or more directions according to the particular travel mode. In other implementations, the navigation device senses a connection to an external power source and use such sensing to set a default travel mode for generating and/or outputting directions. In still other implementations, the navigation device may determine that the user is traveling utilizing a particular travel mode if both the navigation device is connected to an external power source and a travel speed is under or exceeds a threshold. The navigation device may then configure itself to generate (or regenerate) the one or more directions according to the particular travel mode. In yet other implementations, the navigation device may determine that the user is traveling utilizing a given travel mode based on information encoded in a signal received by one or more sensors, such as information encoded in one or more signals indicating that the one or more signals originate from a vehicle, and may configure itself to generate the one or more directions according to the given travel mode. As one further example, many navigational devices may receive Bluetooth™ signals, thereby allowing them to couple to certain systems present in modern automobiles. The handshaking protocol of a Bluetooth™ signal typically identifies the transmitter. In the case of a vehicle (or a system within a vehicle) interacting with the navigational device, the vehicle-initiated signal may include information as to make, model and so on of the vehicle. This data may be used to determine that the user is traveling in the vehicle itself. Based on this determination, the navigation device may configure itself to generate the one or more directions based on a driving mode.

As part of configuring itself to generate the one or more directions based on the automatically determined travel mode, the navigation device may prompt the user with an alert indicating that the operational mode will be set if the user does not override. The navigation device may then only configure itself to generate the one or more directions based on the determined travel mode if a response to override is not received from the user.

After the navigation device generates the one or more directions, the navigation device may determine that the travel mode has changed based on one or more signals received by the one or more sensors. In response, the navigation device may configure itself to a different operational mode based on the changed travel mode, regenerate the one or more directions based on the different operational mode, and display the regenerated one or more directions to the user.

The navigation device may include the one or more sensors and an interface component operable to receive input from the user and provide output to the user. Alternatively, the navigation device may be a server computing device operable to communicate with a client computing device. The client computing device may include a user interface component operable to receive user input which it transmits to the server computing device via a communication component. The client computing device may also be operable to receive output from the server computing device, via the communication component, and provide it to the user. Further, the client computing device may include the one or more sensors and may transmit one or more signals received by the one or more sensors to the server computing device via the communication component.

It is to be understood that both the foregoing general description and the following detailed description are exemplary and explanatory only and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

The description that follows includes exemplary systems, methods, techniques, instruction sequences, and/or computer program products that embody techniques of the present disclosure. However, it is understood that the described disclosure may be practiced without these specific details. Reference will now be made in detail to the subject matter disclosed, which is illustrated in the accompanying drawings.

The present disclosure provides automatic mode sensing and adjustment for navigation devices. The navigation device automatically determines a travel mode based on at least one non-user input and sets an operational mode corresponding to the travel mode. The navigation device then generates one or more directions based on the travel mode and displays the one or more directions to a user.

Figure 1A:
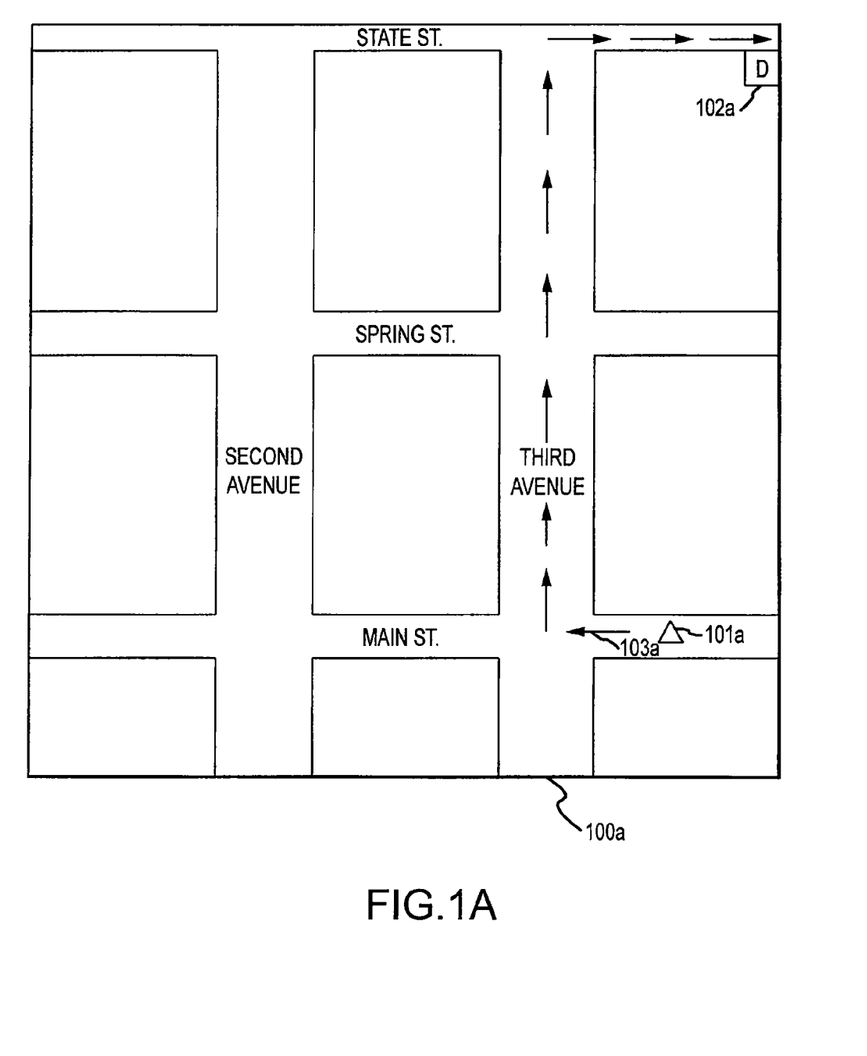
FIG. 1A is a sample screen illustrating directions provided by a navigation device operating in a pedestrian mode.

By way of example, a user utilizing a navigation device may currently be on Main Street and between Third and Fourth Avenues. Also presume the user requires, from the device, directions to an address on State Street located between Third and Fourth Avenues. Further presume the user is walking and set the navigational device to provide directions or navigation routes in a pedestrian mode. FIG. 1A illustrates a sample screen 100a that may be provided by a navigational device in this situation. As illustrated, the user's current location is indicated by the triangle 101a and the user's intended destination is indicated by the D symbol 102a. The direction indicator 103a provided by the navigational device displays to the user that they should take a right on Third Avenue, take a right on State Street, and arrive at their intended destination on the right side of State Street.

Figure 1B:
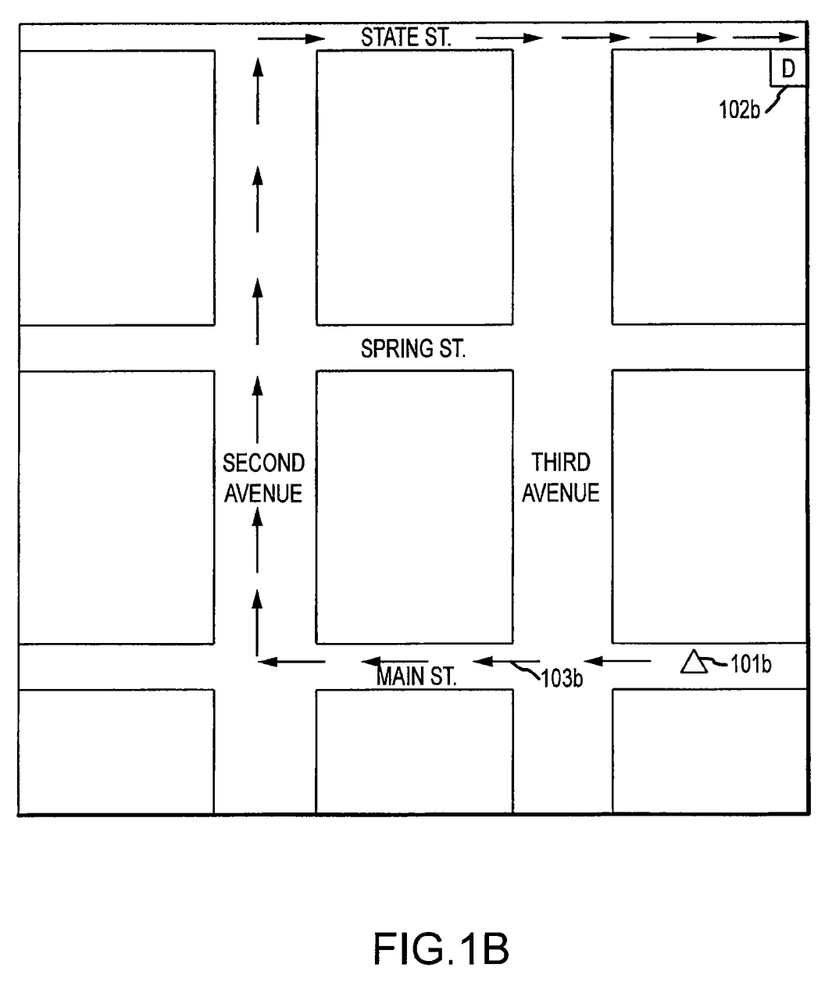
FIG. 1B illustrates a sample screen illustrating a directions provided by the navigation device automatically adjusted to operate in a driving mode.

Continuing the example, the user then enters a vehicle and begins driving to his intended destination. In this example Third Avenue is a one way street permitting travel only from State Street towards Main Street, e.g., in the opposite direction that the user is directed to travel by direction indicator 103a. As a pedestrian, the user could safely follow the navigational direction to his intended destination. However, as the operator of a vehicle, the user cannot safely follow the directions to his intended destination since that would require him to drive the wrong way along a one-way street. One or more sensors receive one or more signals. Based on data from the one or more signals, the navigation device automatically determines that the user is driving and not walking. As a result, the navigational device configures itself to provide directions or navigation routes in a driving mode, generates directions, and displays the directions to the user, shown as sample screen 100b.

As illustrated, the user's current location is indicated by the triangle 101b and the user's intended destination is indicated by the D symbol 102b. The direction indicator 103b provided by the navigational tool displays to the user that they should take a right on Second Avenue, take a right on State Street, and arrive at their intended destination on the right side of State Street. In this example, Second Avenue allows vehicular traffic to travel from Main Street to State Street. Thus, the user can safely follow the directions to his intended destination, all while operating the vehicle.

Although the present example illustrates the directions or navigation routes as an entire path between the user's location and the intended destination, it should be understood that the navigation device may provide the directions one step at a time. In other words, the navigation device may merely present the next step the user should take to proceed between their current location and the intended destination. After the user takes the step indicated in the directions, new directions may be presented to the user presenting the next step the user should take to proceed to the intended destination.

Figure 2:
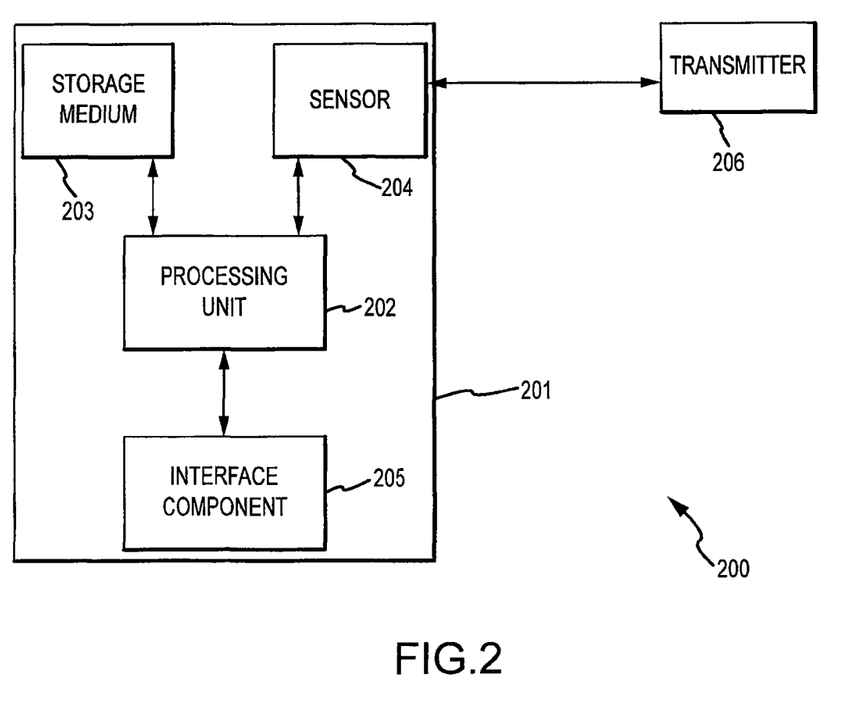
FIG. 2 is a block diagram illustrating a system for performing automatic mode adjustment for a navigation device, in accordance with an embodiment of the present disclosure.

FIG. 2 is a block diagram illustrating a system 200 for performing automatic mode adjustment for a navigational device, in accordance with an embodiment of the present disclosure. System 200 includes navigation device 201 and optional transmitter 206. The navigation device 201 includes processing unit 202, storage medium 203 (which may be any machine-readable storage medium), one or more sensors 204, and interface component 205 (which may be any kind of input and/or output device such as a display screen, a keyboard, a speaker, a touch screen, a mouse, a printer, a microphone, and the like). The navigation device 201 may implement a software navigational tool by utilizing the processing unit 202 to execute software instructions stored in the storage medium 203. The storage medium 203 also stores routing information about one or more geographic regions. The routing information about the geographic region may include various geographic information related to navigation of the region such as roads (one-way streets, traffic circles, speed limits, road travel restrictions, etc.), landmarks, traffic patterns elevation, bridges, and the like. The navigation device 201 receives input from the user via the interface component 205 and provides output to the user via the interface component 205.

The navigation device 201 operates in a first operational mode, corresponding to a first travel mode, which may be based on an input previously entered by the user. The navigation device 201 may receive an intended destination from the user. The navigation device 201 also detects a location of the user, which may be based on one or more signals received by the one or more sensors 204. Alternatively, the navigation device 201 may receive the location from the user. The navigation device 201 may then generate one or more directions or navigation routes based on the routing information stored in the storage medium 202 based on the location of the user, the intended destination, and the first method of travel and display it to the user via the interface component 205.

During operation, the navigation device 201 may receive one or more signals. The navigation device 201 may determine, based on data from the one or more signals, that the navigational device is in a vehicle. For example, the navigation device 201 may receive, via an appropriately configured sensor, a Bluetooth™ signal transmitted by a paired vehicle or vehicular system. The navigation device 201 may determine that the presence of such a signal may be an indication that the navigation device 201 is in a vehicle. Accordingly, the navigation device 201 may configure itself to provide directions or other output appropriate for vehicular travel, even if the tool was previously providing output for pedestrian travel.

Likewise, the navigation device 201 may receive successive GPS signals via a GPS sensor. The navigation device 201 may use these GPS signals to calculate a travel speed. If the travel speed exceeds a threshold, the tool (or device) may conclude that it is in a vehicle and configure itself to provide directions or other output in a vehicular travel mode.

In one sample implementation, the navigation device 201 may determine that the user is traveling utilizing a particular travel mode based on a travel speed the navigation device 201 calculates based on the one or more signals received by the one or more sensors 204. If the travel speed is under a threshold, the navigation device 201 may determine that the user is traveling in a first fashion. However, if the travel speed exceeds the threshold, the navigation device 201 may determine that the user is utilizing a second fashion. By way of example, the second fashion may be vehicular travel and the first fashion may be pedestrian travel. In this example, if the travel speed is under a particular threshold, for example fifteen miles per hour, the navigation device 201 may determine that the user is walking or running (e.g., traveling in a pedestrian mode). However, if the travel speed in this example exceeds the fifteen mile per hour threshold, the navigation device 201 may determine that the user is traveling in a vehicle. In either case, the navigation device 201 may configure itself to output directions appropriate for the user's travel.

By way of example of this sample implementation, the one or more sensors 204 may include a GPS receiver, the transmitter 206 may be one or more GPS satellites, and the one or more signals may be GPS signals received from the one or more GPS satellites. The GPS signals are received by the GPS receiver and may be utilized by the processing unit 202 not only to generate directions, but also to configure the navigation device 201 to generate and output directions appropriate to a travel mode. That is, the navigation device 201 may determine a travel speed from successive GPS signals and, utilizing this travel speed, determine if the navigation device 201 is in a vehicle or being carried by a pedestrian. This determine may be based purely on the rate of travel or may take other factors into account, such as the location of the device itself.

By way of another example of this sample implementation, the one or more sensors 204 may include a cellular receiver, the transmitter 206 may be one or more cellular towers, and the one or more signals may be cellular signals received from the one or more cellular towers. The cellular signals are received by the cellular receiver and may be utilized by the processing unit 202 not only to generate directions, but also to configure the navigation device 201 to generate and output directions appropriate to a travel mode. That is, the navigation device 201 may determine a travel speed from successive cellular signals and, utilizing this travel speed, determine if the navigation device 201 is in a vehicle or being carried by a pedestrian. This determine may be based purely on the rate of travel or may take other factors into account, such as the location of the device itself.

In another sample implementation, the navigation device may determine the user is traveling using a particular travel mode by detecting whether the navigation device 201 is connected to an external power source. For example, the second travel fashion may be vehicular travel and the first travel fashion may be pedestrian travel. In this example, if the navigation device 201 determines that the navigation device 201 is not connected to an external power source, the navigation device 201 may determine that the user is on foot. Conversely, if the navigation device 201 determines that it is connected to an external power source it may decide that the navigation device 201 is in a vehicle.

By way of example of this particular implementation, the one or more sensors 204 may include a voltage and/or current sensor in line with a plug for the power supply for the navigation device 201, the transmitter 206 may be power source external to the navigation device 201 (such as an AC power source or the cigarette lighter power adapter of a vehicle), and the one or more signals may be the power received from the power source.

In yet another sample implementation, the navigation device 201 may determine that the user is traveling utilizing a particular travel mode if both the navigation device 201 is connected to an external power source and a travel speed is over a threshold. In this sample implementation, one of the sensors 204 may receive a signal from a transmitter (such power received by a power supply from an external power source) that is utilized to determine the navigation device 201 is connected to an external power source and another of the sensors 204 may receive another signal from another transmitter (such as a GPS signal received by a GPS receiver from one of more GPS satellites) that is utilized to calculate the travel speed.

By way of example, the second travel fashion may be vehicular travel and the first travel fashion may be pedestrian travel. In this example, if the navigation device 201 determines that the navigation device 201 is not connected to an external power source, the navigation device 201 may determine that the user is on foot. Also in this example, if the navigation device 201 determines that the travel speed is no more than a certain value (for example, nine miles an hour), the navigation device 201 may determine that the user is on foot. However, if the navigation device 201 determines that the navigation device 201 is connected to an external power source and the travel speed exceeds the threshold, the navigation device 201 may determine that the user is in a vehicle.

It should be appreciated that the threshold used by this implementation, or any implementation, may be set as necessary or desired by a manufacturer or user. Likewise, embodiments may base determinations on whether a travel speed is under a threshold as opposed to under or at a threshold.

In still yet another sample implementation, the navigation device 201 may determine the user's travel mode based on information encoded in the one or more signals received by the one or more sensors 204. By way of example, the second travel fashion may be vehicular travel and the first travel fashion may be pedestrian travel. In this example, the transmitter 206 may be a transmitting device coupled to a vehicle that transmits signals encoded with information related to the vehicle. In one example of this sample implementation, the transmitter 206 may be a Bluetooth™ transmitter integrated into a vehicle and the one or more sensors 204 may include a Bluetooth™ receiver. In another example of this sample implementation, the transmitter 206 may be an infrared transmitter coupled to a vehicle's cigarette lighter power adapter and the one or more sensors 204 may include an infrared receiver. In yet example of this sample implementation, the transmitter 206 may be a radio frequency transponder mounted on a vehicle for interaction with an automated toll and/or carpool system and the one or more sensors 204 may include a receiver capable of receiving the signal transmitted by the transponder. In still another example of this sample implementation, the transmitter 206 may be a radio frequency identification (RFID) attached to a vehicle and the one or more sensors 204 may include an RFID tag reader capable of interacting with the RFID tag.

The information may indicate that the one or more signals are transmitted from a vehicle and may include specific information about the vehicle, such as the make, model, and/or manufacturer of the vehicle. The one or more sensors 204 may receive the one or more signals and the navigation device 201 may determine, based on information decoded from the one or more signals, that the navigation device 201 is operating within a vehicle and therefore the user is utilizing vehicular travel. If the sensor 204 is not receiving the one or more signals, the navigational tool may determine, based on the lack of a signal, that the user is utilizing pedestrian travel.

In some examples of this sample implementation, the navigation device 201 may only determine that the user is utilizing vehicular travel if the information in the signal indicates that the one or more signals are transmitted from a transmitter in a particular vehicle. For example, the one or more sensors 204 may include a Bluetooth™ sensor that has been previously paired with a Bluetooth™ transmitter in a specific vehicle. In this example, the navigation device 201 may determine that the user is utilizing vehicular travel if the one or more signals are from the Bluetooth™ transmitter with which the Bluetooth™ sensor has been previously paired. In other examples of this implementation, the navigation device 201 may determine that the user is utilizing vehicular travel as long as the information in the one or more signals does not indicate that the one or more signals are transmitted from a transmitter in a particular vehicle. For example, the one or more sensors 204 may include a Bluetooth™ sensor that has been configured to connect with Bluetooth™ transmitters in a first vehicle and a second vehicle. The first vehicle may be a sedan that a user utilizes for street driving whereas the second vehicle may be an off-road vehicle the user utilizes for off-road travel. In this example, a user may want the navigation device 201 to perform automatic mode sensing and adjustment when utilizing the first vehicle for travel but not when utilizing the second vehicle for travel. Thus, the navigation device 201 may configure itself to operate in a vehicle mode if the one or more signals are from the Bluetooth™ transmitter of the first vehicle but not if the one or more signals are from the Bluetooth™ transmitter of the second vehicle.

In yet again another sample implementation, the navigation device 201 may prompt the user with an alert indicating that the navigation device 201 will configure itself if the user does not override. In this case, the navigation device 201 may only configure itself the user's travel mode if the user does not respond to override. For example, the navigation device 201 may determine from one or more signals received by the one or more sensors 204 that the user is traveling utilizing a particular travel mode. The navigational tool may then alert the user with a prompt to override. The navigation device 201 may wait until the user responds to the alert or may timeout if the user does not respond in a threshold amount of time (such as ten seconds). If the navigation device 201 does not receive a response from the user that specifies to override, whether because the user responded specifying not to override or because the user did not respond during the timeout period, the navigation device 201 may configure itself based on the travel mode.

Figure 3:
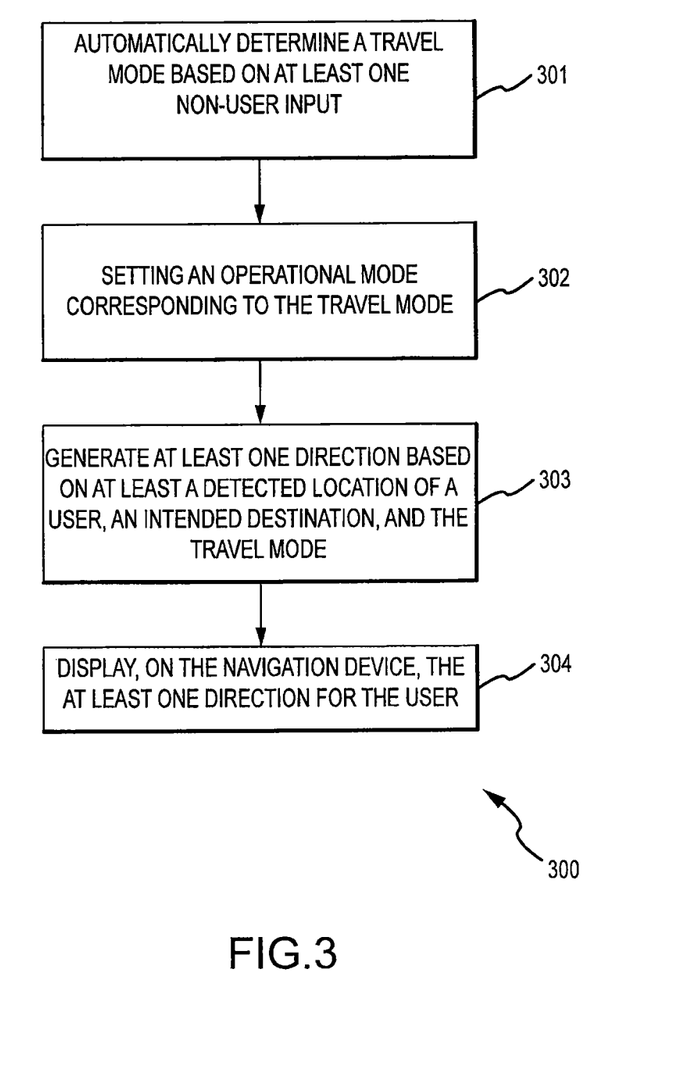
FIG. 3 is a method diagram illustrating a method of automatic mode adjustment for a navigation device which may be performed by the system of FIG. 2.

FIG. 3 is a flow chart illustrating a method 300 of automatic mode adjustment which may be performed by the navigation device 201. The navigation device 201 may perform the method 300 by the processing unit 202 loading and executing one or more instructions embodied in a computer-readable and/or machine-readable medium, such as the storage medium 203 and/or another storage medium.

In operation 310, the processing unit 202 automatically determines a travel mode based on at least one non-user input. The non-user input may be one or more received by the one or more sensors 204. The processing unit 202 may determine the travel mode by calculating a travel speed based on the one or more signals received by the one or more sensors 204, by determining the navigation device 201 is connected to an external power source based on the one or more signals received by the one or more sensors 204, and/or by decoding information encoded in the one or more signals received by the one or more sensors 204.

Figure 4:
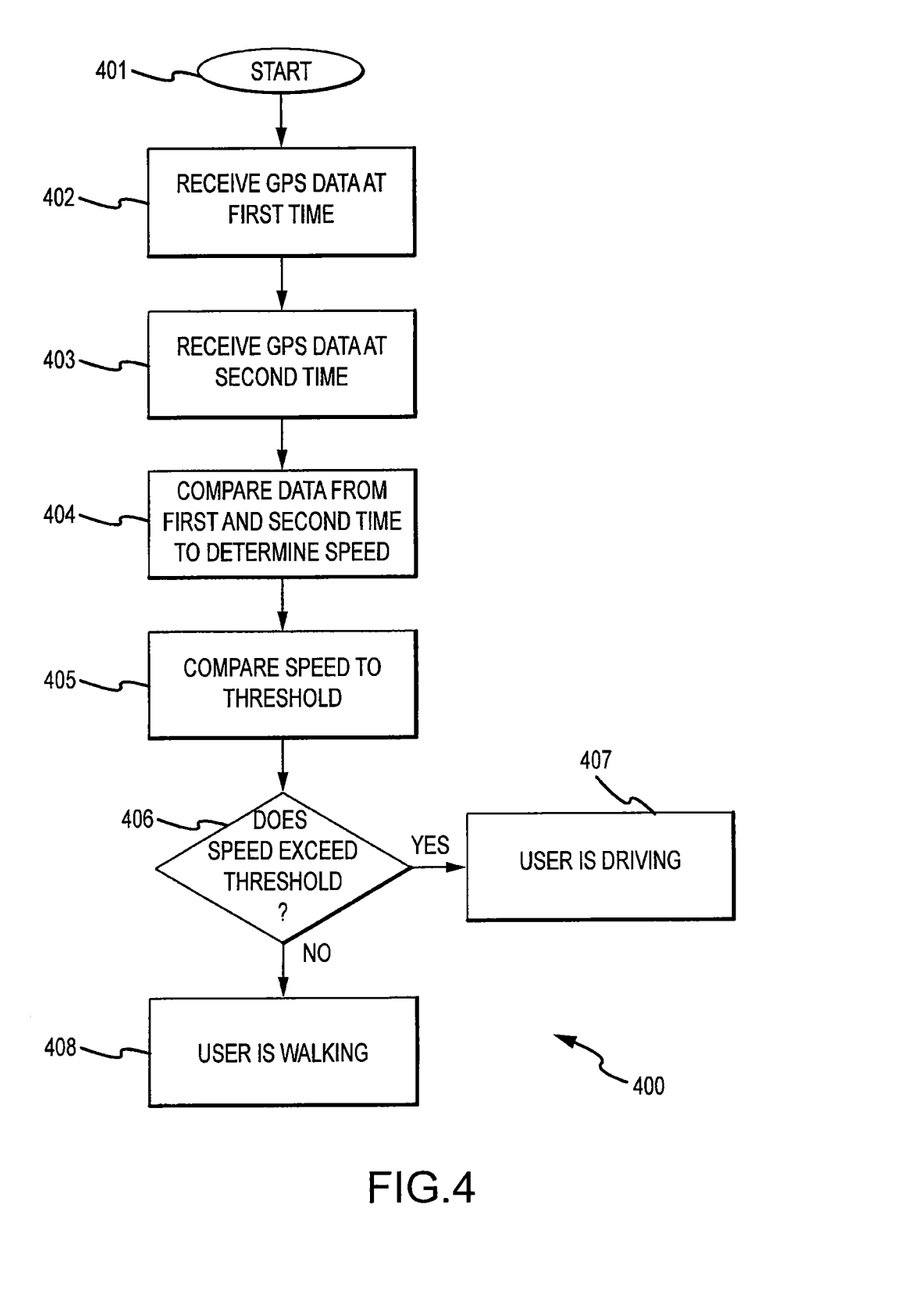
FIG. 4 is a flow chart illustrating a an example of determining a travel mode by calculating a travel speed based on signals received by a GPS receiver.

FIG. 4 is a flow chart illustrating a specific example of determining the travel mode by calculating a travel speed based on signals received by a GPS receiver. The flow starts at block 401 and proceeds to block 402. At block 402, GPS data is received at a first time and proceeds to block 403. At block 403, GPS data is received at a second time and proceeds to block 404. At block 404, a speed is determined by comparing the GPS data received at the first time with the GPS data received at the second time and proceeds to block 405. At block 405, the speed is compared to a threshold and proceeds to block 406. At block 406, it is determined whether the speed exceeds the threshold. If the speed exceeds the threshold, processing proceeds to block 407. At block 407, the travel mode is determined to be a driving mode. If the speed does not exceed the threshold, processing proceeds to block 408. At block 408, the travel mode is determined to be a pedestrian mode.

Referring again to FIG. 3, in operation 320, the processing unit 202 sets an operational mode corresponding to the travel mode. Setting the operational mode may include prompting the user with an alert indicating that the operational mode will be set if the user does not override and only setting the operational mode if a response to override is not received from the user.

In operation 330, the processing unit 202 generates at least one direction or navigation route based on a detected location of a user, an intended destination of the user, and the travel mode. The processing unit 202 may generate the directions based at least partially on routing information about a geographic region stored in the storage medium 203.

In operation 340, the processing unit 202 displays the at least one direction to the user via the interface component 205.

Subsequent to displaying the directions to the user, the processing unit 202 may determine, based on one or more signals received by the one or more sensors 204, that the travel mode has changed to a different travel mode. The processing unit 202 may then set a different operational mode corresponding to the different travel mode, regenerate the at least one direction based on the different travel mode, and display the regenerated at least one direction to the user.

Figure 5:
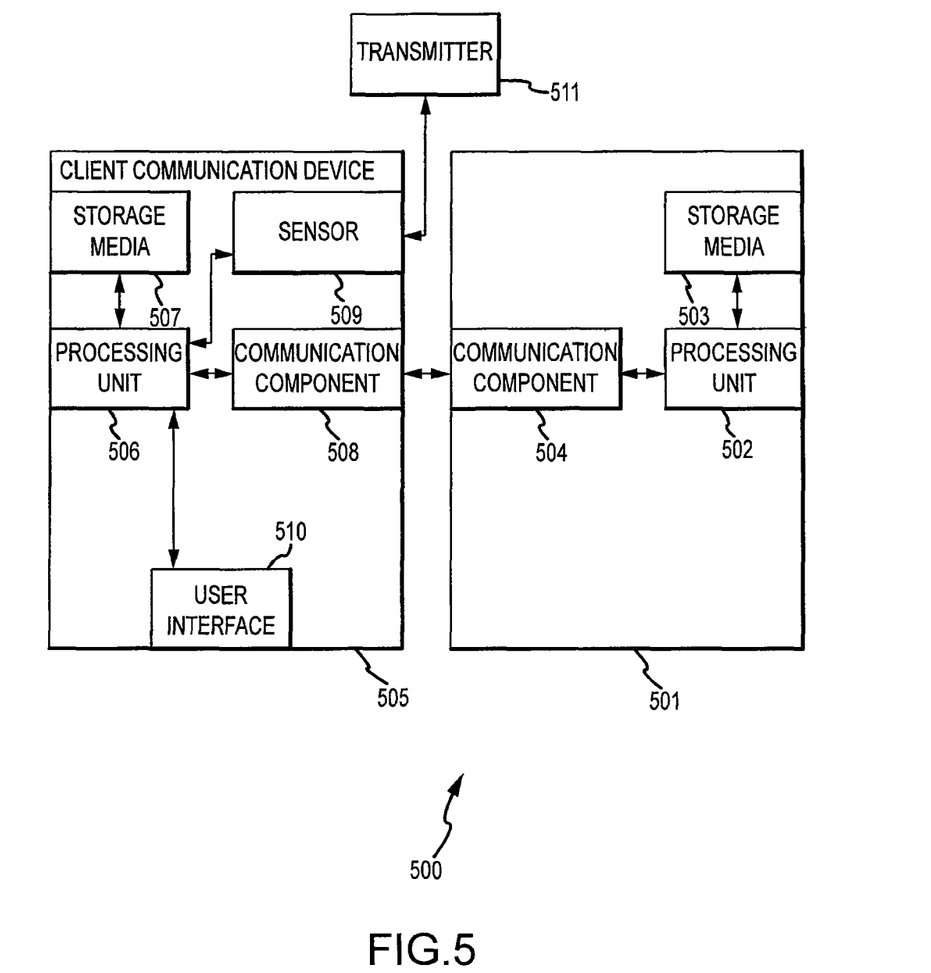
FIG. 5 is a block diagram illustrating a system for performing automatic mode adjustment for a navigation device, in accordance with an alternative embodiment of the present disclosure.

FIG. 5 is a block diagram illustrating a system 500 for performing automatic mode adjustment, in accordance with an alternative embodiment of the present disclosure. System 500 includes server computing device 501, client computing device 505, and optional transmitter 511. The server computing device 501 includes processing unit 502, storage medium 503 (which may be any machine-readable storage medium), and communication component 504 (which may be any kind of communication component for communicating with other computer devices such as a network adapter). The client computing device 505 includes processing unit 506, storage medium 507 (which may be any machine-readable storage medium), communication component 508 (which may be any kind of communication component for communicating with other computer devices such as a network adapter), one or more sensors 509, and user interface 510 (which may be any kind of input and/or output device such as a display screen, a keyboard, a speaker, a touch screen, a mouse, a printer, a microphone, and the like).

The server computing device 501 may implement a software navigational tool by utilizing the processing unit 502 to execute software instructions stored in the storage medium 503. The storage medium 503 also stores routing information about geographic regions including various geographic information related to navigation of the geographic region such as roads, landmarks, traffic patterns elevation, bridges, and the like. The server computing device 501 is operable to communicate with the client computing device 505 via the communication component 504 and the communication component 508. The client computing device 505 receives input from the user via the user interface 510, transmits the input to the server computing device 501, receives output from the server computing device 501, and provides the output to the user via the user interface 510.

The server computing device 501 operates in a first operational mode, corresponding to a first travel mode, which may be based on an input previously entered by the user. The server computing device 501 receives an intended destination from the user. The server computing device 501 also detects a location of the user, which may be based on one or more signals received by the one or more sensors 509 and transmitted to the server computing device 501 by the client computing device 505. Alternatively, the server computing device 501 may receive the location from the user via the client computing device 505. The server computing device 501 may then generate one or more directions or navigation routes based on the routing information stored in the storage medium 503, the location of the user, the intended destination, and the travel mode. The server computing device 501 then transmits the one or more directions to the client computing device 505 which provides it to the user via the user interface 510.

During operation, server computing device 501 may receive one or more signals. The one or more sensors 508 may receive the one or more signals from the transmitter 511. The client computing device 505 may transmit the one or more signals received by the sensor 508 to the server computing device 501. Based on the one or more signals, the server computing device 501 determines that the user is traveling utilizing a particular travel mode which corresponds to a particular operational mode. In response, the server computing device 501 configures itself to provide directions or other output in the particular operational mode.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for automatic mode adjustment for a navigation device, comprising:
   automatically determining, utilizing a navigation device, a travel mode based on at least one non-user input;
   setting, utilizing the navigation device, an operational mode corresponding to the travel mode; and
   generating, utilizing the navigation device, at least one direction based on at least a detected location of a user, an intended destination, and the travel mode.

2. The method of claim 1, further comprising:
   displaying, on the navigation device, the at least one direction for the user;
   automatically determining the travel mode has changed based on at least one additional non-user input;
   setting an additional operational mode corresponding to the changed travel mode;
   regenerating, utilizing the navigation device, the at least one direction based on at least the changed travel mode; and
   displaying, on the navigation device, the regenerated at least one direction for the user.

3. The method of claim 1, wherein the travel mode comprises one selected from the group comprising walking and vehicular travel and the operational mode comprises one selected from the group comprising a pedestrian mode and a driving mode.

4. The method of claim 1, wherein said automatically determining a travel mode based on at least one non-user input comprises:
   calculating a travel speed based on the at least one non-user input; and
   determining the travel mode if the travel speed is under a threshold.

5. The method of claim 1, wherein said automatically determining a travel mode based on at least one non-user input comprises:
   calculating a travel speed based on the at least one non-user input; and
   determining the travel mode if the travel speed exceeds the threshold.

6. The method of claim 1, wherein said automatically determining a travel mode based on at least one non-user input comprises:
   determining whether the navigation device is connected to an external power source based on the at least one non-user input; and
   determining the travel mode if the navigation device is connected to the external power source.

7. The method of claim 1, wherein said automatically determining a travel mode based on at least one non-user input comprises:
   determining whether the navigation device is connected to an external power source based on the at least one non-user input; and
   determining the travel mode if the navigation device is not connected to the external power source.

8. The method of claim 1, wherein the at least one non-user input comprises at least one signal received from a global positioning system.

9. The method of claim 1, wherein said setting an operational mode corresponding to the travel mode comprises:
   presenting an alert to the user indicating that the operational mode will be set if the user does not override; and
   setting the operational mode unless a response is received from the user specifying not to override.

10. A system for automatic mode adjustment, comprising:
    at least one storage medium that stores routing information;
    at least one processing unit, communicably coupled to the at least one storage medium, that generates at least one navigation route based on at least the routing information, a detected location, an intended destination, and an operational mode corresponding to a travel mode; and
    at least one sensor, communicably coupled to the at least one processing unit, operable to receive at least one signal;
    wherein the at least one processing unit is operable to:
    automatically determine the travel mode based on the at least one signal,
    set an operational mode corresponding to the travel mode, and
    generate at least one direction based on at least a detected location of a user, an intended destination, and the travel mode.

11. The system of claim 10, wherein the at least one processing unit is operable to determine the travel mode has changed based on least one additional signal and regenerate the at least one navigation route based on the changed travel mode.

12. The system of claim 10, wherein the at least one processing unit generates the at least one navigation route based on the travel mode to direct pedestrian travel from the detected location to the intended destination.

13. The system of claim 10, wherein the at least one processing unit generates the at least one navigation route at least based on the travel mode to direct vehicular travel from the detected location to the intended destination.

14. The system of claim 10, wherein the processing unit automatically determines the travel mode by determining one of a travel speed is under a threshold or the travel speed exceeds a threshold.

15. The system of claim 14, wherein the processing unit determines the travel speed based on the at least one signal by detecting a first location of the at least one sensor at a first time and a second location of the at least one sensor at a second time and comparing the first location with the second location.

16. The system of claim 10, further including:
    a navigation device that includes the at least one processing unit;
    wherein the processing unit determines, based on the at least one signal, one of the navigation device is receiving power from an external power source or the navigation device is not receiving power from the external power source.

17. The system of claim 16, wherein the external power source comprises an electrical system of a vehicle.

18. The system of claim 10, further comprising:
    a signal transmitter coupled to a vehicle;
    wherein the signal is received from the signal transmitter.

19. The system of claim 10, further comprising:
    an interface component, communicably coupled to the at least one processing unit, that displays the at least one navigation route to the user.

20. The system of claim 19, further comprising:
    a server computing device that includes the at least one processing unit; and
    a client computing device, communicably connected to the server computing device, the client computing device including the at least one sensor and the interface component;
    wherein the client computing device is operable to transmit the signal received by the at least one sensor to the server computing device and the server computing device is operable to transmit the at least one navigation route to the interface component of the client computing device.

* * * * *